Feb. 27, 1945.　　A. T. NABSTEDT　　2,370,484
TRANSMISSION MECHANISM
Filed Dec. 1, 1942　　8 Sheets-Sheet 2

Inventor
Arthur T. Nabstedt
By Rockwell Bartholow
Attorneys

Feb. 27, 1945.   A. T. NABSTEDT   2,370,484
TRANSMISSION MECHANISM
Filed Dec. 1, 1942     8 Sheets-Sheet 6

Inventor
Arthur T. Nabstedt
By Rockwell & Bartholow
Attorneys

Feb. 27, 1945.  A. T. NABSTEDT  2,370,484
TRANSMISSION MECHANISM
Filed Dec. 1, 1942  8 Sheets-Sheet 8

Fig. 8.

Inventor
Arthur T. Nabstedt
By Rockwell & Bartholow
Attorneys

Patented Feb. 27, 1945

2,370,484

UNITED STATES PATENT OFFICE 2,370,484

TRANSMISSION MECHANISM

Arthur T. Nabstedt, Hamden, Conn., assignor to The Snow-Nabstedt Gear Corporation, New Haven, Conn., a corporation of Connecticut Application December 1, 1942, Serial No. 467,502

11 Claims. (Cl. 74—296)

This invention relates to transmission mechanisms, and while not limited thereto, it has special reference to gearing for marine use in which there is not only provision for reversing the direction of drive of the propeller shaft or other driven shaft, but also for obtaining a drive at reduced speed.

An object of the invention is to provide an improved transmission in which a drive shaft and a driven shaft of the transmission mechanism are interposed between and alined with the main driving shaft and the driven shaft, the arrangement being such that when the transmission is used in a boat or other craft the engine can have a low setting.

Another object is to provide a transmission mechanism providing for reduction of speed as well as reversal, adapted for placement between alined shafts, which is quite short so as to occupy a minimum of space lengthwise of the boat, and which is simple and sturdy as well as compact.

Another purpose is to furnish a reverse and reduction gear in which the mechanism used for shifting from the neutral position to the forward drive and reverse positions, respectively, is very easy to operate and control, and of a character permitting considerable slip when that is desired, without damage to the mechanism or undue wear, so that the mechanism has greater range of utility and longer life.

More specifically, it is aimed to provide a mechanism in which brake bands are used for holding certain movable elements, and the advantages of brake bands as distinguished from clutches fully utilized, including the advantage that the bands will act effectively when operating in a lubricant-containing housing, also that the tension of the band can be adjusted readily while the mechanism is in operation.

Another object of the invention is to provide a reduction and reverse gear in which the speed reduction in reverse is the same as in forward drive.

To these and other ends the invention consists in the novel features and combinations of parts to be hereinafter described and finally pointed out in the claims.

The transmission mechanism selected for illustration in Figs. 1 to 5, inclusive, is a reverse and reduction gear for marine use, having a relatively short casing or housing adapted to be set in between an engine shaft and a propeller shaft or other power take-off alined with the engine shaft. In the forward portion of the housing is a main driving shaft having a forwardly projecting front end portion adapted to be coupled to the engine shaft in any preferred manner. In line with this main driving shaft and located in the rear part of the housing is a driven shaft, the rear end portion of which is adapted to be coupled to the propeller shaft or other power take-off. The driving and driven shafts have a common axis of rotation, and preferably they have a centering connection between them. Adjacent the inner end of the drive shaft the latter carries a driving gear, and associated with this gear is a pinion cage connected to the driven shaft, and in association with the driving gear and the pinion cage and its associated pinions are gear elements, one of the external gear type and the other of the internal gear type, which are adapted to be braked selectively according as the driven shaft is to be driven in a direction for forward drive or in a direction for reverse drive, as hereinafter more particularly described. Each of the above-mentioned gear elements has associated with it an external cylindrical friction surface surrounded by a brake band, and the mechanism for operating these bands selectively is located in the upper part of the housing and includes a transversely arranged rock shaft within the housing adapted to be rocked or swung by means including an externally located operating lever.

In the drawings the housing is indicated generally at A, the main driving shaft at B, and the driven shaft at C. In this particular case the driving shaft is intended to be connected to the engine shaft by means of a flange coupling D, but this is by way of example only and it will be understood that the driving shaft can be connected up in other ways, as by being connected to the engine flywheel or otherwise. At the rear end of the driven shaft C a coupling member E connected to said shaft provides for connection to a propeller shaft or the like, this also being by way of example only. The pinion cage referred to is indicated generally at F, this being connected to the forward end of shaft C, and the pinion cage being provided with a number of internal pinions, as hereinafter described. The internal gear element referred to is indicated at G, the same having associated therewith an external brake band H. The external gear element above referred to is indicated at I, and in association therewith is an external brake band J. The mechanism in the upper part of the housing from which the brake bands H and J are selectively operable is indicated generally at K, and includes the transversely arranged rock shaft K' and the externally located operating lever indicated at K''.

Referring now to the details, it will be seen that the forward end of the housing A is closed in by a removable plate portion A' secured in place by means such as bolts 15 at its periphery and provided adjacent its central portion with a depression 16 in which is fitted a flange 17. The flange 17 carries packing material 18 of suitable character extending into engagement with a portion of coupling D, so that an oil seal is provided for retaining oil or other lubricant with which the interior of the housing is supplied. Adjacent its central portion the plate A' is provided with a sleeve portion 19 forming a support for a ball bearing 20 in which the forward portion of shaft B is mounted, the inner race of this bearing being placed between a collar 21 and a snap ring 21' on the shaft. The plate A' is continued inwardly beyond the sleeve 19 to provide a further sleeve 22 of reduced diameter in comparison to the sleeve 19, and this sleeve 22 is longer than sleeve 19 and is extended into the housing a substantial distance so as to provide a substantial support and bearing for the gear I and its associated parts, and also for a portion of the pinion cage F, which portion is rotatably supported on the rotary element carrying the gear I.

In the form shown, the gear I, which may be termed a fulcrum gear, is provided by forming external teeth on a sleeve-like member 23, and this sleeve-like member 23 is rigidly connected to a web 24 of a braking element 25 having a rim 26 with a cylindrical friction surface adapted to cooperate with the brake band J. From the externally toothed portion of sleeve 23, the sleeve is extended forwardly, and adjacent the forward end there is a flange 27 formed on the sleeve, which flange is fitted in an annular recess in web 24. The sleeve 23 is fastened to the web, so as to be rigid therewith, by means such as bolts 28 passing through a portion of the web and through the flange 27 above mentioned. For supporting the element formed by the sleeve 23 and the web carrying the braking rim, suitable anti-friction devices are interposed between this element and the sleeve 22. In the form shown, an anti-friction bearing having rollers 29 is interposed between the rear end of sleeve 22 and the rear end portion of the surrounding element, whereas a ball bearing 30 is interposed between the forward portion of sleeve 22 and the forward portion of sleeve 23, ball bearing 30 being fitted within an annular seat in sleeve 23.

Figure 1:
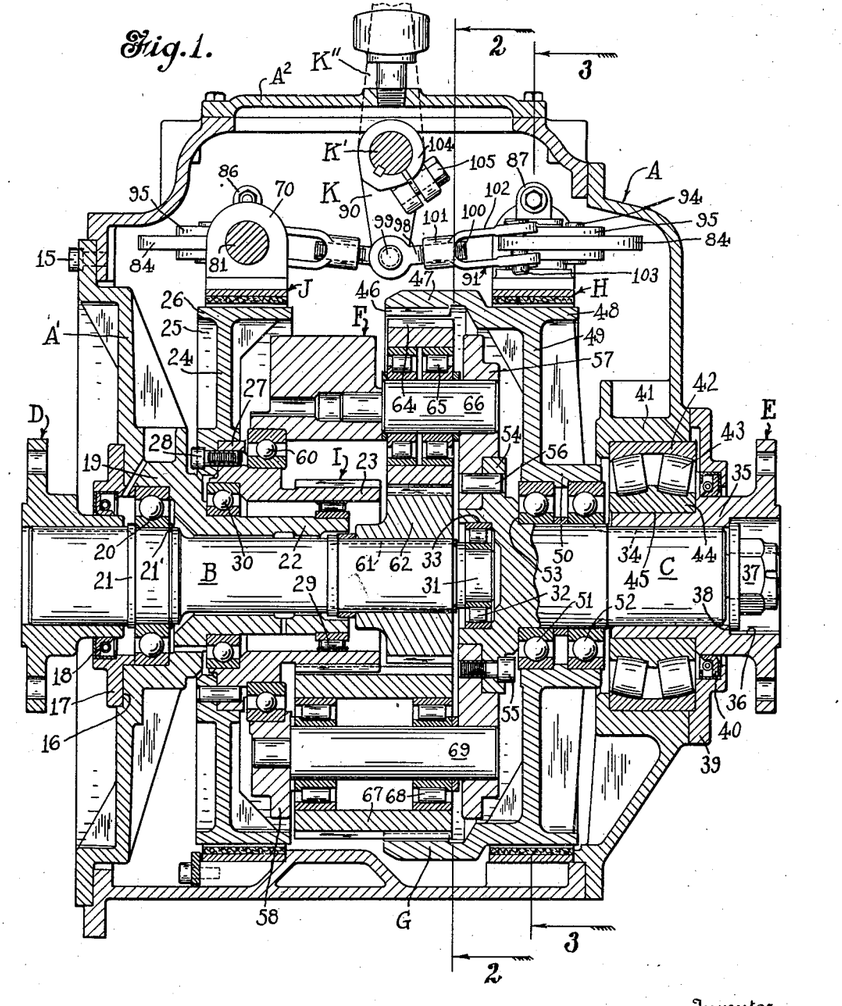
Fig. 1 is a central longitudinal section of a marine reverse and reduction gear embodying my invention, the mechanism being shown in the neutral position.

It will be noted from Fig. 1 that the rear or right-hand end of driving shaft B has a short portion 31 of reduced diameter surrounded by a roller bearing 32, this roller bearing being fitted within a socket 33 in the laterally enlarged left-hand end portion (Fig. 1) of shaft C. In this manner the two shafts which are free for relative rotation are centered with respect to each other. At its rear end shaft C has a coupling member E connected thereto, as previously indicated, and preferably coupling E is keyed to shaft C by keys 34, the keys being engaged with a sleeve portion 35 of the coupling member. The coupling member extends rearwardly beyond the shaft and is provided at its rear end with a socket 36, and within the socket 36 a bolt and nut connection 37 engaging a shoulder 38 prevents relative endwise movement of the coupling member and shaft and effectively holds the coupling member to the shaft. Around the rear portion of the coupling member a plate 39 is arranged, said plate being secured at its peripheral portion to housing A in a suitable manner, and being provided at the open portion thereof surrounding the coupling member with packing material 40 engaging the coupling member in such a manner as to provide a lubricant seal.

In front of the plate 39 the coupling member and its associated shaft are supported from the end wall of the housing so that they can rotate freely, and for this purpose the end wall of the housing is provided with a bearing sleeve portion 41 within which is fitted the outer race 42 of a suitable roller bearing having rollers 43 and an inner race 44, the inner race being engaged in an annular seat 45 formed adjacent the forward end of the coupling member.

Forwardly of the bearing for the rear end portion of shaft C are provisions for the rotatable mounting with respect to the shaft, of the internal gear element G, previously mentioned. In the particular case illustrated, the internal gear G is formed by providing teeth 46 upon the inner surface of a ring 47, which is continued integrally in a rearward direction to provide a braking rim 48 of somewhat reduced diameter in comparison to the gear ring, the rim 48 having a cylindrical outer surface with which brake band H cooperates. The rim 48 is integrally connected to a web 49, generally similar to web 24, and like it provided with a hub providing for rotational support, the hub in this case being the sleeve member 50 extended rearwardly from web 49. Between the hub portion 50 and the shaft C suitable anti-friction means is interposed, for example, the ball bearings 51 and 52, bearing 51 being arranged forwardly of bearing 52 and engaging a positioning shoulder 53 on shaft C.

The portion of shaft C providing the shoulder 53 is laterally enlarged, and this enlarged portion carries a flange 54 which is fastened by means such as bolts 55 and pins 56 to an annular member or ring 57. This member 57 provides the rear wall of the pinion cage F, previously mentioned.

The front wall of the pinion cage is formed by a somewhat similar annular member 58. The front and rear walls of the cage are interconnected by spacing members 59 of T-shaped cross section. Journaled in the front and rear walls of the cage are the shafts of a number of pinions, as hereinafter described. It will be evident from what has been said that at its rear end the cage is rigid with the shaft C. At its forward end, on the other hand, the cage is supported from a portion of the element carrying the fulcrum gear I, and for this purpose it is preferred to arrange a ball bearing 60 between the inner forward portion of the cage and the hub portion from which gear I is supported.

Adjacent the rearward end of driving shaft B the latter has fastened thereto, as by keys 61, a gear 62 which may be referred to as the engine gear, and which is supported within the cage centrally of the planetary pinions with which the cage is equipped. It will be noted also that the sun gear which is the fulcrum gear I is extended into the cage by way of the open front portion of the latter, the gear I being in front of gear 62 and in close proximity thereto, and in this particular case of somewhat larger diameter than gear 62. The gear element G is disposed around the rear portion of the cage so as to engage certain of the cage pinions.

Figure 2:
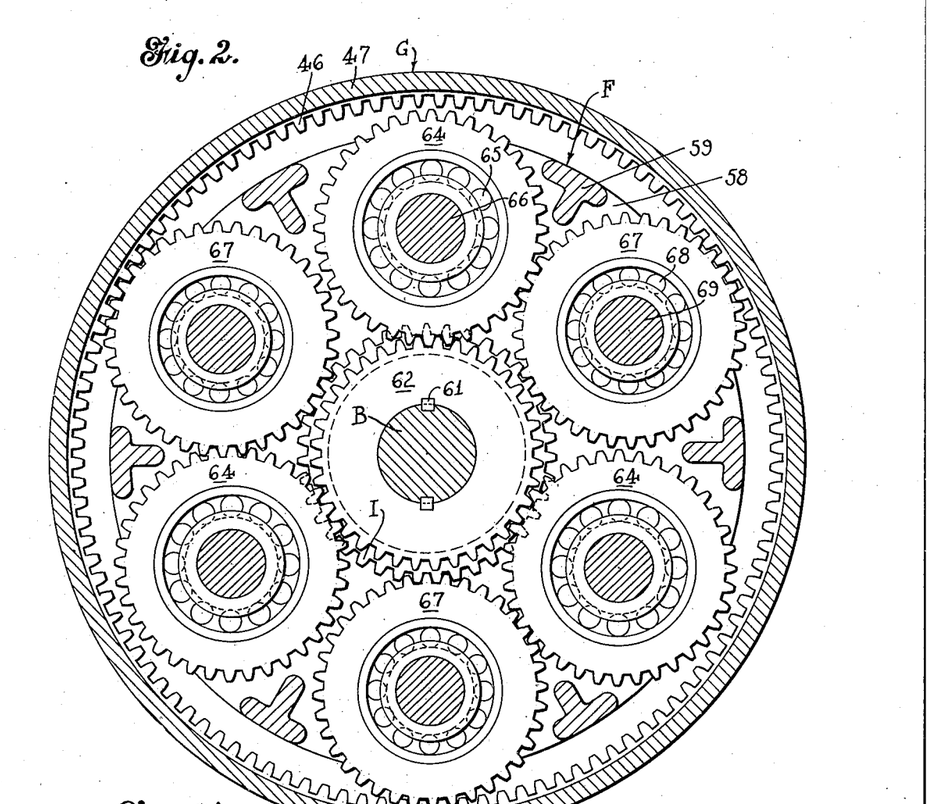
Fig. 2 is a section on line 2—2 of Fig. 1.

The engine gear 62, as will be seen from Fig. 2, engages at equidistant points three relatively short pinions 64 supported by means of roller bearings 65 on shafts 66 extending between the front and rear walls of the cage. Each of the pinions 64 is engaged at one side only with a long pinion 67, the pinions 67 alternating with the pinions 64 and being supported by roller bearings 68 on suitable pinion shafts 69. The long pinions 67 in the plane or zone where the short pinions 64 are located engage the internal teeth 46 of the internal gear G, and the forwardly extended portions of the long pinions engage the teeth of the external fulcrum gear I.

Figure 3:
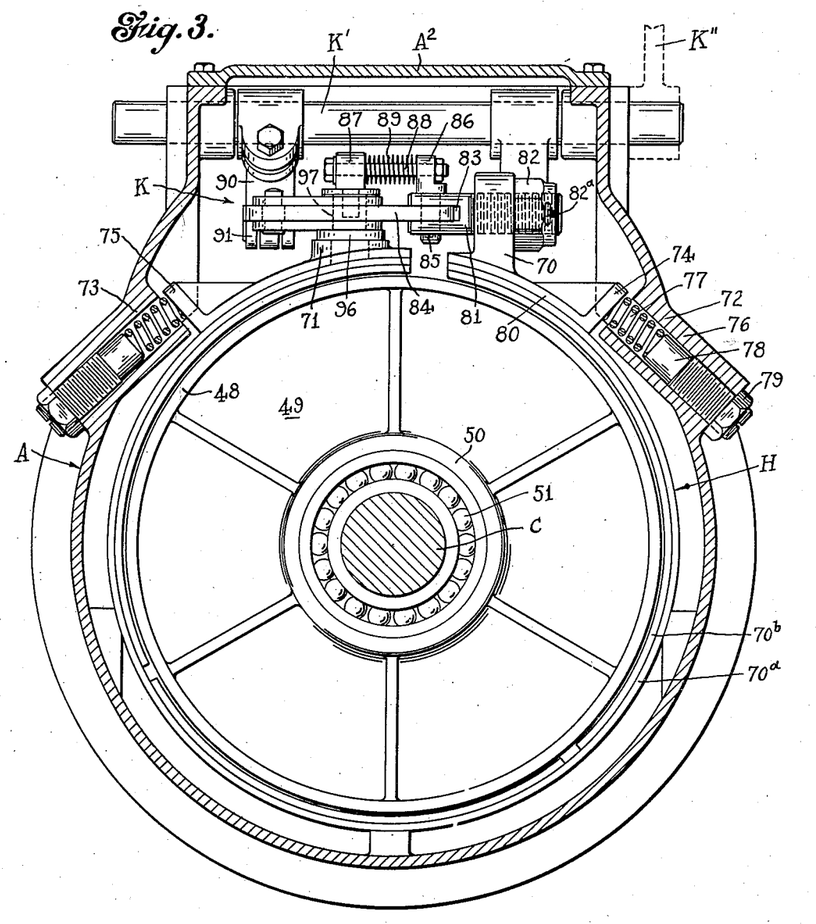
Fig. 3 is a section on line 3—3 of Fig. 1, certain parts associated with the brake band farthest from the observer being omitted for the sake of clearness.

Referring now to Fig. 3, it will be seen how the brake band H is formed and mounted, and as the construction and mounting of the band J is practically identical, a description of one will suffice. The band H comprises a spring metal member in the form of a split ring 70ª having an abutment 70 at one side of the gap between the extremities, and an abutment 71 associated with the other terminal. The ring 70ª is provided interiorly with a suitable lining 70ᵇ. The band is located relatively to the housing and limited in its movement by spring devices 72 and 73 acting against outstanding lugs 74 and 75, respectively, secured to the metal band. The device 72 comprises a cylindrical socket portion 76 formed on the housing and containing a helical spring 77 adapted to engage lug 74, the spring 77 being held under compression in an adjustable manner by means of a bolt member 78 disposed in the socket portion and adjustable lengthwise therein by screwing it in and out of the socket portion, after which the bolt is secured in position by a lock nut 79. The spring device 73 is of similar construction, and it will be seen that whereas spring device 72 limits movement of the band in a clockwise direction (Fig. 3), spring device 73 limits the band movement in a counter-clockwise direction.

The abutment 70 is in the form of an upstanding lug, and preferably this lug is formed as a part of a plate member 80, which is the same member on which lug 74 is formed, although this is not essential. Through a perforation in the lug 70 extends a pin 81 having threads engaging corresponding threads in a nut 82 bearing against the lug whereby the pin is adjustable in a longitudinal direction, the pin being fixed in the adjusted position by means such as a cotter pin 82ª. At the opposite side of the lug the pin 81 is provided with a kerf 83 into which is extended the extremity of a curved lever 84 adapted to operate in a substantially horizontal plane, the lever extremity being pivoted to the pin 81 by means of a pin 85. The pin 85 has a head 86, and this head forms a part of a sliding connection between the pin 81 and the abutment 71, said abutment 71 having a head 87 at its upper end connected to head 86 by a rod 88 slidably engaged with bores in the heads 86, 87, and surrounded between the heads by a helical spring 89 which is under compression and which tends to separate the ends of the brake band.

Figure 3A:
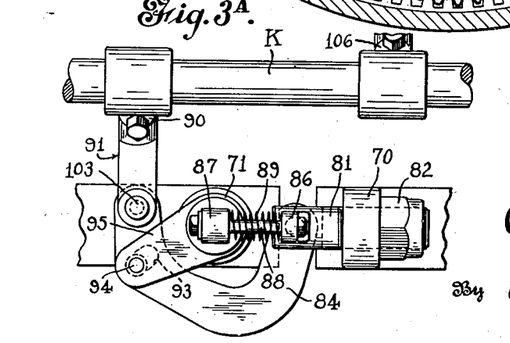
Fig. 3A is a detail plan view of a portion of the brake-operating mechanism shown in Fig. 3.

The lever 84, previously mentioned, which may be of the shape shown in Fig. 3ᴬ, is connected at its other extremity to an actuating arm 90 attached to the rock shaft K', the connection being made by means of a link 91 pivoted to lever 84. Adjacent the pivot connection, lever 84 is provided with a slot 93 in which operates a pin 94 carried adjacent the extremity of a bifurcated lever element 95 having a swivel mounting on abutment 71. Preferably the abutment 71 has a base portion 96 from which projects upwardly a post 97 serving as a swiveling support for lever 95, the head 87, previously mentioned, being detachably connected in a suitable manner to the upper end of this post. Lever 95 swings on this post and has the bifurcated portion straddling lever 84 and engaging it by the lost-motion connection 93, 94.

The link 91, previously mentioned, is preferably constituted by a two-part member so that it is adjustable in length, one of the parts being a member 98 having at one end a hinge connection with the free end of arm 90, as indicated at 99, and provided at the opposite end with a threaded shank 100 engaging a threaded sleeve 101 carried by a clevis 102 which constitutes the other part of the two-part link and embraces the extremity of lever 84 and is pivoted thereto by a pin 103. In effect the link 91 embodies a turnbuckle for adjusting its length. The arm 90, which extends downward from the rock shaft, preferably has a split sleeve 104 surrounding the rock shaft and splined thereto and clamped in place by a clamp bolt 105.

It will be understood that in the neutral position of the gear, the brake-tightening means will have the position shown in Fig. 1, the arm 90 being vertical, and a similar arm 106 appurtenant to the brake band J also being vertical. Fig. 3ᴬ shows how these arms are spaced at different points along the length of rock shaft K'. Now it will be understood that when it is desired to tighten band H, the rock shaft will be swung in a clockwise direction with reference to Fig. 1, thereby pulling the link 91 to the left (Fig. 1), and with it the attached extremity of lever 84. As this action takes place, the lever 95 is swung on its swivel or pivot from the initial position shown in Fig. 3ᴬ so as to bring its outer end more closely into line with the abutments 71, 70. This causes the ends of the band to be drawn together and the band to be tightened on the rim of the drum or web member so as to hold the drum against rotation. While this action is occurring, the pin and slot connection 93, 94 appurtenant to the other brake member J permits its lever 84 to have a certain amount of motion in the brake-releasing direction without any injurious effect. When the time comes to release the band H, the rock shaft is turned back to the initial position in a counter-clockwise direction (Fig. 1), and if it is desired to tighten band J the shaft will be turned farther in the same direction, as will be understood.

It will be understood that in the neutral position of the gearing shown in Fig. 1, there will be no drive of the driven shaft C. The shaft B will be driven continuously by the engine, and the engine gear 62 will be continuously rotated, and there will be some tendency for the pinion cage to rotate in a clockwise direction (Fig. 2) when the engine gear is rotated in a clockwise direction, owing to the engagement of the engine gear teeth with the teeth of the short pinions 64, although this will be resisted by the inertia of the pinion cage and shaft C and the propeller resistance. Owing to the fact that the short pinions are in rotatable engagement with the long pinions, and the long pinions in turn in toothed engagement with the internal gear G, there will be idling movement of internal gear G in a clockwise direction (Fig. 2). The long pinions 67 being rotated on their axes in a clockwise direction (Fig. 2) under these circumstances, the external gear I in toothed engagement with portions thereof will idle in a counter-clockwise direction.

Figure 4:
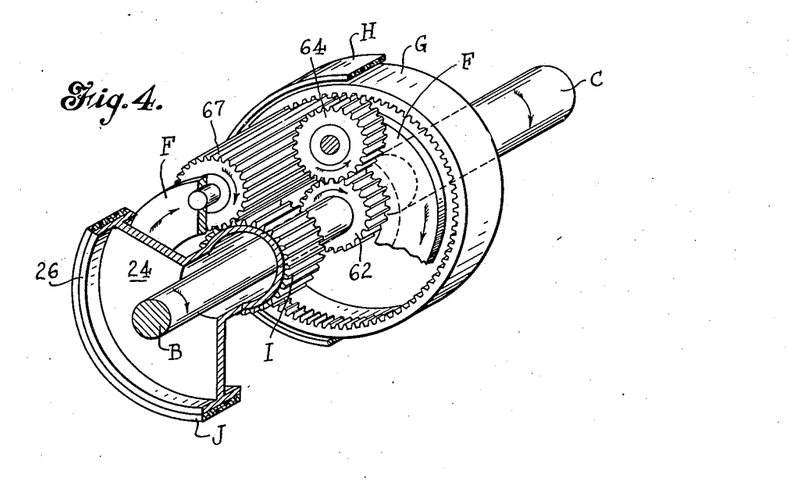
Figs. 4 and 5 are perspective views somewhat distorted and of diagrammatic character, illustrating the operation of the mechanism, the position shown in Fig. 4 being for forward drive and the position shown in Fig. 5 being for reverse drive.

When it is desired to secure forward drive, shaft K' is rocked in a counter-clockwise direction (Fig. 1) so as to tighten band J on the brake drum 24, 26 carried by external fulcrum gear I. Gear I being thus fixed and acting as a fulcrum, the rotation of engine gear 62 causes opposite rotation on their axes of the short pinions and rotation on their axes in the same direction of the long pinions, and the long pinions travel around the fulcrum gear I in a circular path, thus rotating the pinion cage and the driven shaft attached to it in the same direction as the drive shaft, all as shown in Fig. 4.

Figure 5:
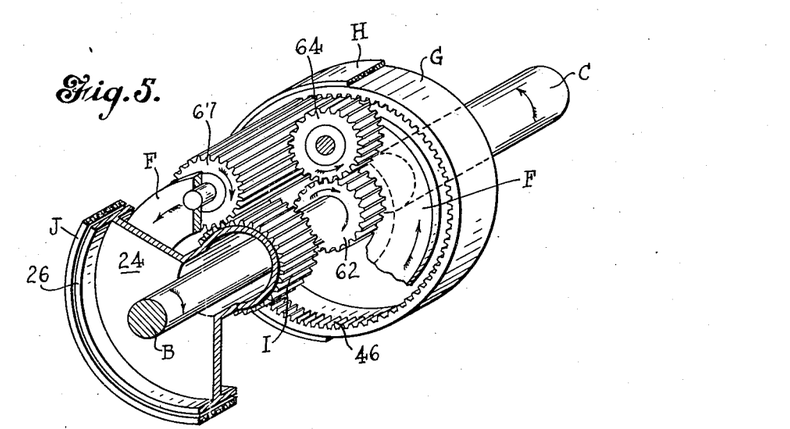

When it is desired to reverse the direction of rotation of the propeller shaft, the rock shaft is moved in a direction to apply brake band H, and thus lock in fixed position the internal gear member G, the gear I being free to rotate. Under these circumstances the drive is as shown in Fig. 5, the rotation of the engine gear causing opposite rotation on their axes of the short pinions, which rotate the long pinions on their axes in the same direction as the drive shaft, and which long pinions, in traveling around the interior periphery of the fixed internal gear, cause the pinion cage and thus the driven shaft to be rotated oppositely to the drive shaft.

The reduction in speed of the driven shaft relatively to the drive shaft in the form selected for illustration is in the ratio of one to two. This reduction is brought about by imparting the planetary movement to the pinions, and therefore to the attached cage, by having the long pinions travel in a path or orbit over one or the other of the fucrum gears. In this particular case the cage rotates once while the engine gear is rotating twice. In the particular case shown, the engine gear, the short pinions, and the long pinions all have an equal number of teeth but this is not essential, as will be pointed out later on. It is an important feature of the invention that, as in the case shown, the driven shaft can be rotated at the same speed in reverse as in forward drive. In this particular form the engine gear has thirty-six teeth, the short idler pinions thirty-six, the long pinions thirty-six, the internal gear one hundred and eleven, and the external fulcrum gear or sun gear thirty-nine teeth.

By associating three pairs of pinions, each consisting of a short pinion and a long pinion, with the engine gear and the fulcrum gears, the tooth loads are divided by three, and there is a good balancing of the gearing, with avoidance of side thrust. The pinion cage is very effectively supported for its rotational movement, being strongly supported at the front as well as at the rear, and the fulcrum gear elements are also very effectively supported. The gearing speeds and the bearing speeds are relatively low, so that friction is reduced to a minimum. The mechanism can be kept well lubricated with relative ease, as the housing may contain lubricating oil, which, by the motion of the interior parts, will be carried continually to the bearings requiring lubrication.

It will be evident that the mechanism is quite short so as to occupy a minimum of lengthwise space in a boat or other craft, and in relation to the power transmitted, the transmission can be of light weight. The brake bands are very conveniently operable by actuation of a common actuator such as a rock shaft, and the mechanism can be manipulated to place it in neutral, forward drive, or reverse drive, with very little effort and by a short movement which may have considerable rapidity. The brake bands can be slipped to a considerable extent, when that is desired, without injury to the mechanism, the possible slippage being much greater than that of a disk clutch, for example, and the bands can be slipped even when under heavy tension, and when tightened again will hold firmly, there being ample clamping power even when the friction material is thoroughly saturated with oil. The band has a certain wrapping action when tightened, which is of assistance in effecting quick stoppage of the appurtenant brake drum. It is not necessary to seal off separately the spaces containing the brake bands, and these bands can be in the same housing with the other parts, there being only two oil seals in the particular form shown, and these being at the respective ends of the housing where they are readily accessible for adjustment or repair.

The driven shaft, driven at reduced speed, is in line with the drive shaft, and this enables the engine to have a low setting in the craft, there being no need to prop up the engine from beneath, because the drive shaft of the transmission when the transmission is installed in the boat is at a relatively low elevation.

One of the advantages of the brake band control is that the bands can be adjusted during the operation of the mechanism. For adjusting one of the bands a cap plate $A^2$ is removed from the top of the housing, thus giving access to the connection between the ends of the band, and for tightening or loosening the band the corresponding post 81 is shifted in the appropriate direction by manipulation of nut 82.

The relative diameters of the several gears and pinions, as illustrated in Figs. 1 to 5, inclusive, are by way of example only, and various changes in this respect can be made in order to meet various conditions. As one example of a different arrangement, it may be said that in a transmission similar to that previously described in which the internal fulcrum gear has one hundred and eleven teeth, the engine gear may have twenty-seven teeth, the short pinions thirty-six, the long pinions thirty, and the sun gear fifty-one teeth. Such an arrangement will result in the speed ratio between the drive shaft and the driven shaft being substantially three to one rather than two to one, as in the form first described. Many other variations can obviously be made.

Figure 6:
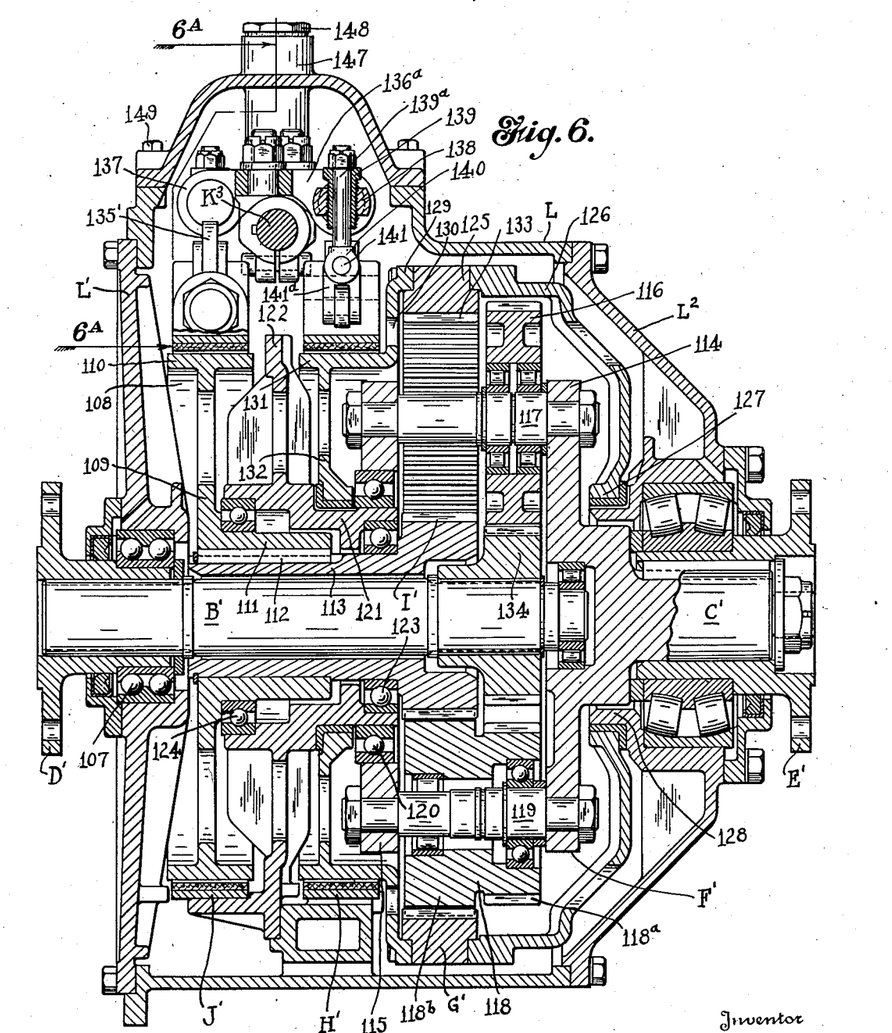
Fig. 6 is a longitudinal central section of a reverse and reduction gear of somewhat modified form, the same being shown in the neutral position.
Figure 6A:
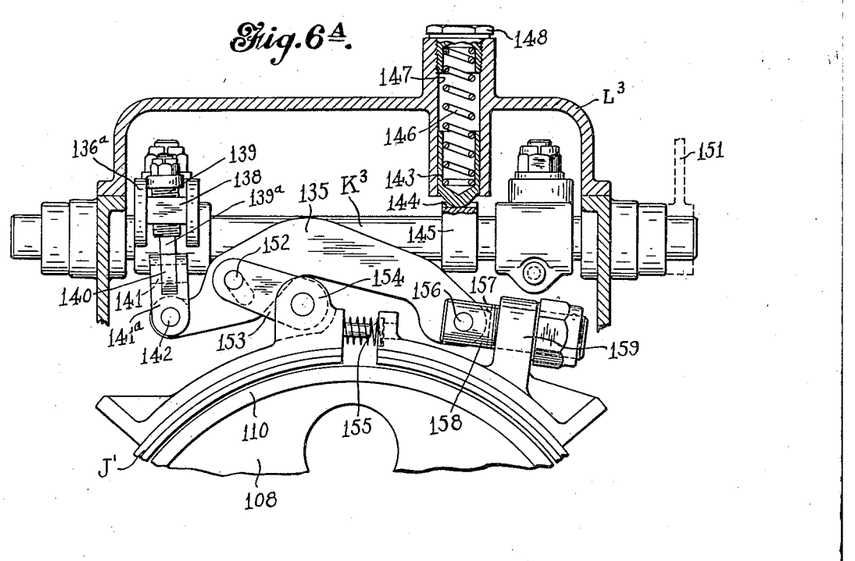
Fig. 6A is a section on line 6A—6A of Fig. 6.
Figure 6B:
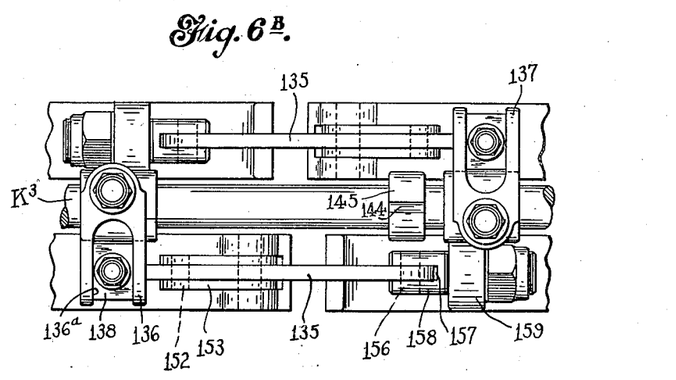
Fig. 6B is a fragmentary plan view of the brake-band-operating mechanism.

In the modified form shown in Figs. 6, 6<sup>A</sup> and 6<sup>B</sup>, the same general principles above referred to are employed, one of the differences being that here the fulcrum gears are disposed in the same plane, and the long pinions are of stepped formation, as hereinafter more particularly described. Here also the brake device for the internal fulcrum gear is located forwardly of said gear rather than rearwardly thereof.

In this form, the driving shaft B' corresponds substantially to shaft B, and the driven shaft C' corresponds substantially to shaft C. At the forward end of shaft B' is a coupling member D', and at the forward end of the housing L is a plate L' in which is set a ball bearing 107 supporting the coupling member and shaft. At the rear end of the housing the construction is very similar to that of Fig. 1, the shaft C' being equipped with a coupling member E'. The pinion cage is indicated at F", the internal gear element at G', and its brake band at H'. The external fulcrum gear is indicated at I', and its associated brake band at J'. The transversely arranged rock shaft for operating the bands is indicated at K³.

Rearwardly of the plate L' at the forward end of the housing is the brake drum 108 for locking fulcrum gear I', and this drum comprises a web 109, a rim 110, and a hub 111. The hub 111 is keyed by key means 112 to a sleeve 113 embraced thereby, said sleeve 113 being preferably made integral with the fulcrum gear I', as shown.

The cage F" comprises a rear plate 114, a front plate 115, short pinions 116 mounted on shafts 117, and long pinions 118 mounted on shafts 119. In the form shown the rear plate of the cage is integral with the driven shaft. The front plate of the cage is supported by a ball bearing 120 on a rearwardly projecting sleeve 121 formed as a part of a transverse supporting wall or partition 122 with which the housing is equipped, and between the rear end portion of sleeve 121 and the sleeve carrying the external fulcrum gear I' is a ball bearing 123, this ball bearing being received in a suitable seat in sleeve 121. At the forward end portion of sleeve 121 another ball bearing 124 is seated, providing rotational support for the hub portion of the brake drum rigid with the gear I'.

The internal gear element G' comprises an internally toothed ring 125 to which is rigidly attached at the rear a shell 126 enclosing portions of the cage and pinions and rotatably supported at its open rear inner part, indicated at 127, upon a bearing support 128 provided upon the detachable rear wall L² of the housing. Rigid with the ring 125 at the forward portion thereof is a member 129 having a web 130, a braking rim 131 similar to rim 110, and a web 132 providing with rim 131 a brake drum. The web 132 has an open inner part rotatably supported upon a portion of the sleeve 121, previously mentioned.

The long pinions 118 are of stepped formation, having smaller rear portions 118<sup>a</sup> engaged with the respective associated short pinions, and larger forward portions 118<sup>b</sup> engaged with internal teeth 133 of the internal gear and also with the teeth of gear I'. The engine gear, which is fixed on the rear end portion of shaft B', as indicated at 134, and this gear, as before, is engaged with the three short pinions.

The operating mechanism for the brake bands H' and J' is generally similar to that previously described, but inasmuch as the two brake drums in this case are closer together, it is expedient to employ a somewhat different arrangement of the connections between the rock shaft and the two bands. The bands are formed and arranged similarly to those of the form first described, and the band-tightening mechanism is very similar, involving swinging, tightening and releasing levers 135, 135' similar to the previously described levers 84, but operating in vertical planes at opposite sides of the rock shaft K³. The rock shaft carries an arm 136 connected to lever 135, and an arm 137 connected to lever 135'. The two connections are identical and therefore it will suffice to describe the connection between lever 135 and arm 136. This includes a block 138 mounted between cheeks 136<sup>a</sup> of arm 136 in such a manner as to be tiltable in a plane parallel to the cheeks. Through this block is threaded a sleeve 139 having an approximately vertical position and acting as a guide for a rod 139<sup>a</sup> provided at the lower end with an eye 140 to which is pinned by a pin 141 a short link or clevis 141<sup>a</sup> in which the adjacent extremity of lever 135 is engaged and pivoted by means of a pin 142.

The rock shaft K³ may be held in a position corresponding to neutral, so as not to be readily displaced, by means of a spring-pressed plunger 143 mounted in a removable cap plate L³ of the housing, and having a pointed lower end adapted to engage a groove 144 in a collar 145 fixed on the shaft. A spring 146 acting on the plunger 144 within a socket 147 of the cap plate may be held in place by a screw cap 148. The cap plate may be held in position removably by means such as bolts 149. It will be understood that for tightening one of the brake bands the shaft K³ is rocked by means such as a lever 151 in such a direction as to pull downwardly on the corresponding lever 135 or 135' at the pivotal connection 142. This tightens the band on the drum in substantially the same manner as in the form previously described. Each of the levers 135 and 135' has connected to it by a pin and slot connection 152, a lever 153 hinged in a terminal lug 154 of the corresponding band. A spring 155 interposed between the ends of the band holds the band normally in released position. At its end opposite the pivotal connection 142, the lever 135 (and also 135') is pivoted by a pin 156 in a vertical kerf 157 of a pin or bolt 158 mounted in a lug 159 on the band in a manner similar to that in which pin 81, previously described, is mounted in lug 70.

It is believed that the operation of the device now under consideration will be clear from the foregoing description, the method of operation being substantially the same as that of the form first described. It will be understood, however, that an additional reduction of speed as compared with the form of Fig. 1 will be obtained, because, in addition to the reduction obtained by moving the pinion cage through planetary movement of the pinions, there is in this form a reduction of speed in the primary gear train from the engine gear to the portions of the long pinions which engage the external and internal fulcrum gears. It will be noted that in this form the fulcrum gears are in the same plane, and that, while a portion of a long pinion is in toothed engagement with the external or sun fulcrum gear, an opposite portion of said pinion in a transverse direction relatively to the gearing is in toothed engagement with the internal gear. By stepping the long pinions and having their portions of greater diameter engage both fulcrum gears, it is possible to obtain a greater speed reduction than otherwise.

The partition or supporting wall interposed between the two brake drums is of a character such that it will not interfere in any appreciable manner with the circulation of lubricating oil from end to end of the housing, and as before, the only oil seals required are those at the respective ends of the housing.

Figure 7:
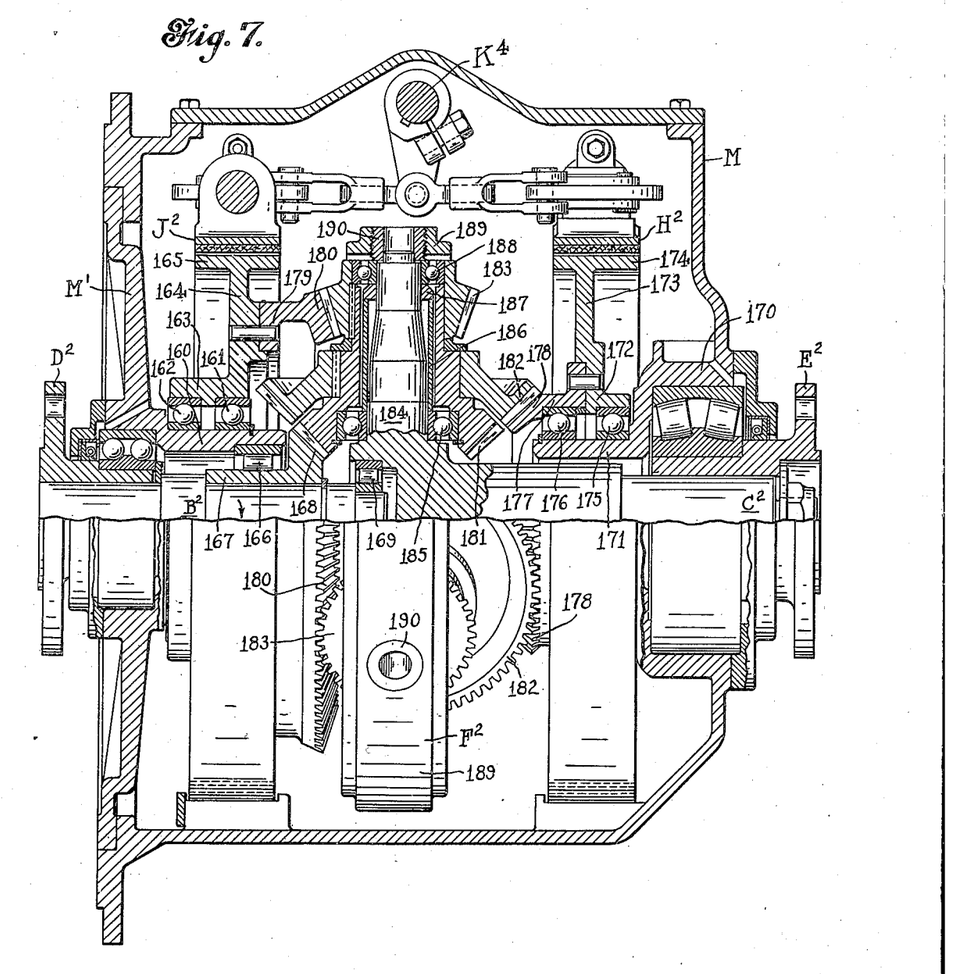
Fig. 7 is a longitudinal central section partly in elevation, showing a third form of reduction and reverse gear, employing bevel gears.
Figure 8:
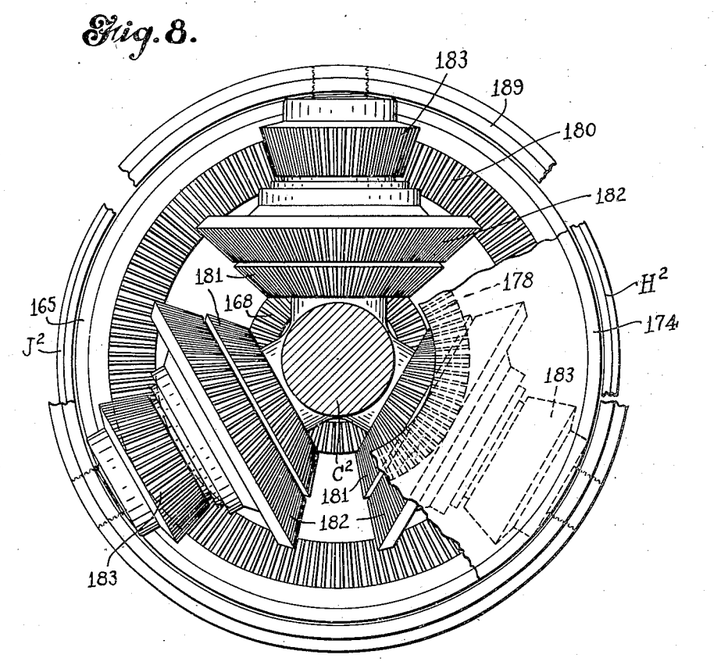
Fig. 8 is an elevation of the bevel gearing, with the driven shaft in section.

In the modification shown in Figs. 7 and 8, many of the general principles of the gear hereinbefore explained are retained, but in this form there is a substitution of bevel gears for the spur gearing. In this form the housing M contains a forward drive shaft $B^2$ and a rear driven shaft $C^2$, the drive shaft carrying a coupling member $D^2$ and the driven shaft carrying a coupling member $E^2$. At the forward end of the housing is a detachable plate M' having an integral rearwardly extending sleeve 160 on which is mounted by means of ball bearings 161, 162 the hub 163 of a brake drum 164 having a rim 165 adapted to be engaged by a brake band $J^2$. Within the sleeve 160 is a roller bearing 166 forming an exterior support for a sleeve 167 of a bevel gear 168 keyed or otherwise fixed to shaft $B^2$.

At its forward end the shaft $C^2$ extends substantially to the middle of the housing, and at that point it has a centering connection with shaft $B^2$, indicated at 169. At its rear end the shaft $C^2$ is mounted in the housing in substantially the same manner previously described, but the bearing portion 170 of the rear housing wall is continued forwardly and reduced in diameter to provide a supporting sleeve 171 for the hub 172 of a brake drum 173 having a rim 174 coacting with a brake band $H^2$. Hub 172 is supported from sleeve 171 by a ball bearing 175, and forwardly of ball bearing 175 is a similar ball bearing 176 supporting the sleeve or hub portion 177 of a bevel gear 178, which is rigidly attached to the drum 173 adjacent the open inner part of said drum. By providing the drum 173 with the fixed bevel gear 178 rigid therewith, a fulcrum bevel gear is provided carrying a rigid brake drum. In a similar manner the brake drum 164 has associated therewith a fulcrum bevel gear, this being provided by attaching to the drum 164 in an intermediate zone the hub or flange 179 of a bevel gear 180. The bevel gear 178 faces in a generally forward direction from the rear brake drum and the gear 180 faces in a generally rearward direction from the forward brake drum, and the gear 180 is of a minimum diameter substantially greater than the maximum diameter of gear 178.

Between the fulcrum gear elements thus provided, there is located in the housing a rotary cage $F^2$ carrying a plurality of bevel pinions. In the form shown there are three sets of pinions spaced equidistantly about the cage in a circumferential direction, each set consisting of three bevel pinions rotating about a common radial axis, the innermost pinion of each set being in engagement with the engine gear 168, there being a middle pinion in engagement with the bevel gear 178, and an outermost pinion in engagement with the gear 180. In Fig. 7, one set of pinions is shown in longitudinal section, and this comprises an inner relatively small bevel gear pinion 181 in engagement with the engine gear, a larger intermediate pinion 182 in engagement with gear 178, and a relatively small outermost bevel pinion 183 in engagement with gear 180. The mounting of the three pinions of a set can be as shown in Fig. 7, all three being mounted to rotate about a fixed axle member 184 projecting integrally and radially from the inner end portion of the driven shaft. Supported around the base portion of axle member 184 is a ball bearing 185, and engaged with this bearing is a spacer 186, and at the outer end of spacer 186 is a ring member 187, and beyond ring member 187 is a ball bearing 188. The bevel gear 181 has a stepped sleeve set over the ball bearing 185 and extending outward substantially to ball bearing 188, and upon this sleeve is rigidly attached the intermediate bevel gear 182, and to the outer portion of the sleeve is rigidly attached the outermost pinion 183, the arrangement being such that all three pinions of the set rotate as a unit about the axle member 184. At the outer circumferential part of the pinion cage $F^2$ a ring member 189 is applied after the assembly has been completed, and in order to hold the axle members 184 and the outer ball bearings 188 firmly in place, bushings 190 of ring-like form are screwed into this ring.

The operating mechanism for the brake bands $J^2$ and $H^2$ is substantially the same as in the form of Fig. 1, this mechanism including a rock shaft $K^4$ corresponding to rock shaft K' and operated in a similar manner.

In the operation of this mechanism the direction of rotation of shaft $B^2$ may be as indicated by the arrow in Fig. 7. In such case the engine gear 168 rotates pinion 181, and the other pinions moving with it, in a counter-clockwise direction. Any rotational tendency of the cage when the gearing is in the neutral position shown in Fig. 7 is overcome by the resistance of the propeller. When it is desired to rotate the driven shaft $C^2$ in the forward direction, the band $H^2$ is tightened to lock the drum 173 so that the gear 178 carried by this drum will be held against movement. When this occurs the cooperating gear 182, which is rotated from the engine gear in a counter-clockwise direction, will exert a turning thrust upon the cage in the proper direction for the desired drive. The reduction in speed of the driven shaft is obtained, as before, by the planetary movement of the three pinions (182) which are traveling around the gear 178 in a circle. When it is desired to obtain reverse drive, the band $H^2$ is released and the band $J^2$ tightened, and the shaft $C^2$ will then be rotated oppositely with reference to the drive shaft, pinion 183 traveling along gear 180.

While in all cases herein I have described the shaft attached to the pinion cage as being the driven shaft rather than the drive shaft, it will be apparent that in some instances it may be expedient to reverse this arrangement. In such a reversal a speed-up gearing will be provided rather than a reduction gearing.

It is also to be understood that, while in the forms of the improved transmission which are preferred, the two elements which are to be locked selectively against rotation are stopped by means of brake bands rather than clutches, this is not essential in the broadest aspects of the invention.

I am aware that previous to my invention selectively operable brake bands have been employed in connection with separate elements of a reverse gear in which there is a reduction of speed between the drive shaft and the driven shaft, but I know of no instance in which the elements braked correspond to the elements which are selectively braked in the mechanism of my invention, and it is desired to point out that an important advantage of the present mechanism arises from the fact that in reverse the driven shaft is or can be driven at the same speed as in forward drive, and that, moreover, this result is achieved in a very simple and direct manner, utilizing a minimum number of gear elements so arranged as to provide a simple, compact and rugged transmission. The novel mechanism can be used in various industrial installations as well as for the propulsion of marine craft.

A wide range of embodiments can be used in carrying out the inventive idea, involving various changes in the organization of parts and in the mechanical details, without departure from the principles of the invention or the scope of the claims.

What I claim is:

1. A reduction and reverse gear comprising a housing, two independently rotatable shafts in said housing in line with each other, one shaft being the forward part and the other being the rear part and one being a driving and the other a driven shaft, said shafts being in substantially meeting arrangement intermediate the ends of the housing, a cage fixed to the driven shaft, a driving gear fixed to the driving shaft within the cage, sets of intermeshed planetary pinions carried by the cage driven from the driving gear, fulcrum gears in the housing co-acting with the planetary pinions and adapted when fixed in position to cause rotation in different directions respectively to be imparted to the cage and its associated shaft, brake bands for locking the respective fulcrum gears arranged at different points lengthwise of the housing, and means in the upper part of the housing between the bands by which said bands are operable selectively to lock the fulcrum gears.

2. A reduction and reverse gear comprising driving and driven shafts, a driving gear fixed to one and a cage fixed to the other, sets of pinions in planetary arrangement carried by the cage and rotated on their axes from said driving gear, and fulcrum gears co-acting with the pinions and normally freely rotatable but adapted to be selectively locked in fixed position so as to obtain forward drive or reversal of the driven shaft, each set of pinions including a long pinion of uniform diameter throughout its length engaging at one end portion with one fulcrum gear and at the other end portion with the other fulcrum gear.

3. In a transmission mechanism, the combination of a housing having end walls and an upper wall, aligned longitudinal shafts in the housing extended through the respective end walls and in substantially meeting arrangement interiorly of the housing, one of said shafts carrying at its inner end a gear, and the other of said shafts carrying at its inner end a pinion cage, sets of pinions within said cage located at different circumferential points, each set having a pinion in intermeshed relation to said gear, and each set having toothed elements arranged to engage fulcrum gear members, fulcrum gear members meshed with said pinion sets and mounted for rotation about the axis of the shafts, brake drums fixed to the respective fulcrum gear members and having outer peripheral friction surfaces, one of said brake drums having a forward location in the housing and the other a rearward location, brake bands encircling the respective drums, a rock shaft in the upper part of the housing disposed transversely of the housing beneath the upper wall thereof and adapted to be turned from the exterior of the housing, devices for tightening and releasing the respective brake bands extending respectively rearwardly from the forward brake band and forwardly from the rearward band, and means for connecting said devices with said rock shaft so that when the shaft is rocked in one direction one band is tightened and the other released, and when rocked in the opposite direction the first band is released and the other tightened.

4. In a transmission mechanism, the combination of a housing having end walls and an upper wall, aligned longitudinal shafts in the housing extended through the respective end walls and in substantially meeting arrangement interiorly of the housing, one of said shafts carrying at its inner end a gear, and the other of said shafts carrying at its inner end a pinion cage, sets of pinions within said cage located at different circumferential points, each set having a pinion in intermeshed relation to said gear, and each set having toothed elements arranged to engage fulcrum gear members, fulcrum gear members meshed with said pinion sets and mounted for rotation about the axis of the shafts, brake drums fixed to the respective fulcrum gear members and having outer peripheral friction surfaces, one of said brake drums having a forward location in the housing and the other a rearward location, brake bands encircling the respective drums, a rock shaft in the upper part of the housing disposed transversely of the housing beneath the upper wall thereof and adapted to be turned from the exterior of the housing, devices for tightening and releasing the respective brake bands extending respectively rearwardly from the forward brake band and forwardly from the rearward band, and means for connecting said devices with said rock shaft so that when the shaft is rocked in one direction one band is tightened and the other released, and when rocked in the opposite direction the first band is released and the other tightened, said devices being connected to said rock shaft at different points in the length of said shaft.

5. Reduction and reverse gearing having driving and driven shafts adjacent and in line with each other, a cage carried by the driven shaft, sets of intermeshed spur pinions arranged planetwise in the cage, a spur gear for rotating said pinions on their axes fixed to the driving shaft, separate fulcrum spur gear members associated with the pinion sets and normally freely rotatable, and means for braking said fulcrum members selectively, each pinion set comprising a long pinion and a short pinion meshed with the long pinion, the short pinion of each set being meshed with said gear and the long pinion of each set being meshed with both of the fulcrum members.

6. In a transmission mechanism, the combination of a housing having end walls and an upper wall, aligned shafts in the housing extended through the respective end walls and in substantially meeting arrangement interiorly of the housing, one of said shafts carrying at its inner end a gear, and the other of said shafts carrying at its inner end a pinion cage having a platelike element in a plane adjacent that of said gear, sets of intermeshed spur pinions arranged planetwise in said cage, each set comprising a short pinion adjacent said platelike element and meshed with said gear and also comprising a long pinion meshed with the short pinion and having an unmeshed portion disposed at the side of the short pinion which is remote from said platelike element, separate fulcrum gear members meshed with the long pinions, and means for braking said fulcrum members selectively.

7. In a transmission mechanism, the combination of a housing having end walls and an upper wall, aligned shafts in the housing extended through the respective end walls and in substantially meeting arrangement interiorly of the housing, one of said shafts carrying at its inner end a gear, and the other of said shafts carrying at its inner end a pinion cage having a platelike element in a plane adjacent that of said gear, sets of intermeshed spur pinions arranged planetwise in said cage, each set comprising a short pinion adjacent said platelike element and meshed with said gear and also comprising a long pinion meshed with the short pinion and having an unmeshed portion disposed at the side of the short pinion which is remote from said platelike element, separate fulcrum gear members meshed with the long pinions, and means for braking said fulcrum members selectively, said fulcrum members being engaged by said long pinions at different points in the length of said pinions.

8. In a transmission mechanism, the combination of a housing having end walls and an upper wall, aligned shafts in the housing extended through the respective end walls and in substantially meeting arrangement interiorly of the housing, one of said shafts carrying at its inner end a gear, and the other of said shafts carrying at its inner end a pinion cage having a platelike element in a plane adjacent that of said gear, sets of intermeshed spur pinions arranged planetwise in said cage, each set comprising a short pinion adjacent said platelike element and meshed with said gear and also comprising a long pinion meshed with the short pinion and having an unmeshed portion disposed at the side of the short pinion which is remote from said plate-like element, separate fulcrum gear members meshed with the long pinions, and means for braking said fulcrum members selectively, said fulcrum members being engaged by said long pinions at different points in the length of said pinions, one of said fulcrum gear members being an internal gear rotatable about the shaft which carries the cage.

9. In a transmission mechanism, the combination of a housing having end walls and an upper wall, aligned shafts in the housing extended through the respective end walls and in substantially meeting arrangement interiorly of the housing, one of said shafts carrying at its inner end a gear, and the other of said shafts carrying at its inner end a pinion cage having a platelike element in a plane adjacent that of said gear, sets of intermeshed spur pinions arranged planetwise in said cage, each set comprising a short pinion adjacent said platelike element and meshed with said gear and also comprising a long pinion meshed with the short pinion and having an unmeshed portion disposed at the side of the short pinion which is remote from said platelike element, separate fulcrum gear members meshed with the long pinions, and means for braking said fulcrum members selectively, said fulcrum members being engaged by said long pinions at different points in the length of said pinions, one of said fulcrum gear members being an internal gear rotatable about the shaft which carries the cage, said internal gear being meshed with said long pinions in the plane of the short pinions.

10. A reduction and reverse gear comprising a housing, two independently rotatable shafts in said housing in line with each other longitudinally of said housing and in substantially meeting arrangement intermediate of the ends of the housing, a bevel gear fixed to the inner end of one of said shafts, a cage fixed to the inner end of the other shaft, fulcrum bevel gears in the housing freely rotatable on the axis of said shafts with one arranged on one side of the division between the shafts and the other on the other side of said line, sets of bevel pinions carried by the cage, each set having its pinions rotating about a radially disposed axis, each set including a pinion meshing with said first-mentioned bevel gear and also including other pinions meshed respectively with said fulcrum bevel gears, brake drums fixed to the respective fulcrum gears and of larger diameter than said gears, brake bands for locking the respective fulcrum gears disposed within said housing, and means disposed within said housing between said bands for operating said brake bands selectively.

11. A reduction and reverse gear comprising a housing, two independently rotatable shafts in said housing in line with each other and in substantial meeting arrangement intermediate of the ends of the housing, one shaft being in the forward part and the other being in the rear part, a bevel gear fixed to the inner end of one of said shafts, a cage fixed to the inner end of the other shaft, a fulcrum bevel gear loosely surrounding one of said shafts in the forward part of the housing, another fulcrum bevel gear loosely surrounding the other shaft in the rear part of the housing, said fulcrum bevel gears being of different diameter, sets of concentric bevel pinions having radial axes carried by and within said cage, there being three pinions in each set one of which meshes with the first-mentioned bevel gear and the other two of which mesh with the respective fulcrum bevel gears, brake drums carried by the respective fulcrum gears, brake bands encircling said brake drums, and means disposed within the upper part of the housing between the fulcrum gears for operating said brake bands selectively so that one is tightened as the other is released.

ARTHUR T. NABSTEDT.